United States Patent
Lo et al.

(10) Patent No.: US 8,928,241 B2
(45) Date of Patent: Jan. 6, 2015

(54) METHOD AND APPARATUS FOR CONTROLLING BRIGHTNESS OF LIGHT EMITTING DIODES

(75) Inventors: Chung Ping Kevin Lo, Hong Kong (CN); Kwok Hung Poon, Hong Kong (CN); Wa-Hing Leung, Hong Kong (CN); Kam Wah Siu, Hong Kong (CN)

(73) Assignee: Huizhou Light Engine Ltd., Huizhou, Guangdong (CN)

( * ) Notice: Subject to any disclaimer, the term of this patent is extended or adjusted under 35 U.S.C. 154(b) by 1085 days.

(21) Appl. No.: 12/949,684

(22) Filed: Nov. 18, 2010

(65) Prior Publication Data

US 2011/0115401 A1    May 19, 2011

Related U.S. Application Data

(60) Provisional application No. 61/262,582, filed on Nov. 19, 2009.

(51) Int. Cl.
H05B 37/02      (2006.01)
H05B 33/08      (2006.01)

(52) U.S. Cl.
CPC .......... H05B 33/0812 (2013.01); *Y02B 20/343* (2013.01)
USPC ............ 315/291; 315/307; 315/225; 315/287

(58) Field of Classification Search
CPC ............ H02M 5/2576; H05B 33/0812; H05B 33/015; H05B 39/08; H05B 41/3924; Y02B 20/343
USPC .................. 315/291, 209, 307, 308, 244, 245
See application file for complete search history.

(56) References Cited

U.S. PATENT DOCUMENTS

| | | | | |
|---|---|---|---|---|
| 5,477,111 | A * | 12/1995 | Steely et al. | 315/194 |
| 5,585,713 | A * | 12/1996 | Crane et al. | 323/323 |
| 2009/0033243 | A1 | 2/2009 | Gater | |
| 2009/0212721 | A1 * | 8/2009 | Maruyama | 315/307 |

FOREIGN PATENT DOCUMENTS

| | | |
|---|---|---|
| CN | 101494938 A | 7/2009 |
| CN | 201345755 Y | 11/2009 |

OTHER PUBLICATIONS

PCT Notification of Transmittal of the International Search Report and the Written Opinion of the International Searching Authority, or Declaration dated Feb. 24, 2011 in connection with PCT/CN2010/078880.

* cited by examiner

*Primary Examiner* — Douglas W Owens
*Assistant Examiner* — Amy Wang
(74) *Attorney, Agent, or Firm* — Schiff Hardin LLP (57) ABSTRACT

A circuit for driving a light emitting diode (LED) comprises: an alternating voltage power supply, comprising a triac dimmer having a firing angle and output terminals that provide power to the LED; a zero crossing detector that detects a polarity change of the alternating voltage provided by the alternating voltage power supply and provides a zero crossing output signal indicative of the zero crossing; a timer triggered by the zero crossing output signal that generates a timer output signal during a time period of the timer; and LED power circuitry that reduces current to the light emitting diode based upon timing characteristics of the timer output signal.

2 Claims, 14 Drawing Sheets

FIG. 1

PRIOR ART

FIG. 2

PRIOR ART

FIG. 3

PRIOR ART

FIG. 4

PRIOR ART

METHOD AND APPARATUS FOR CONTROLLING BRIGHTNESS OF LIGHT EMITTING DIODES

CROSS-REFERENCE TO RELATED APPLICATION

This application claims benefit under 35 U.S.C. §119(e) to U.S. Provisional Patent Application No. 61/262,582, filed Nov. 19, 2009, which is hereby incorporated by reference.

BACKGROUND OF THE INVENTION

The present invention relates to apparatuses and methods for controlling brightness of light emitting diodes (LEDs).

It is often desired to have a dimming function in supplying power for lighting apparatuses. One commonly used dimmer is the well-known triac dimmer. A triac dimmer reduces its load power by chopping the load voltage that drives the current to the load during each half-cycle.

Figure 1:
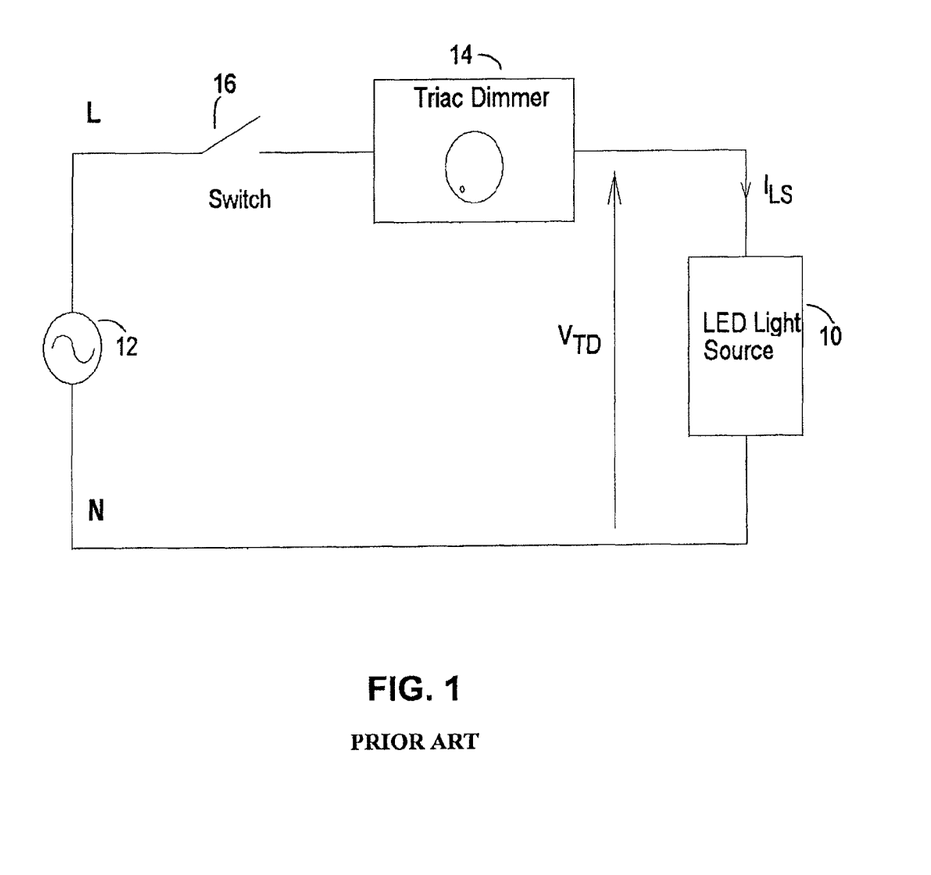
FIG. 1 is a diagram showing a conventional connection of a triac dimmer with an LED light source.

FIG. 1 shows a typical connection of a triac dimmer 14 and a LED light source 10. One end of the LED light source 10 is connected to the Neutral line N of the AC power source 12. The other end of the LED light source 10 is connected to a triac dimmer 14, which is in turn connected to the Live line L of the AC power source 12, through an optional switch 16. Most common dimmers are leading edge type dimmers in which the conduction at each half cycle is delayed from the zero crossing point so that the first voltage presented to the load after the zero crossing is the leading edge of the voltage.

Figure 2:
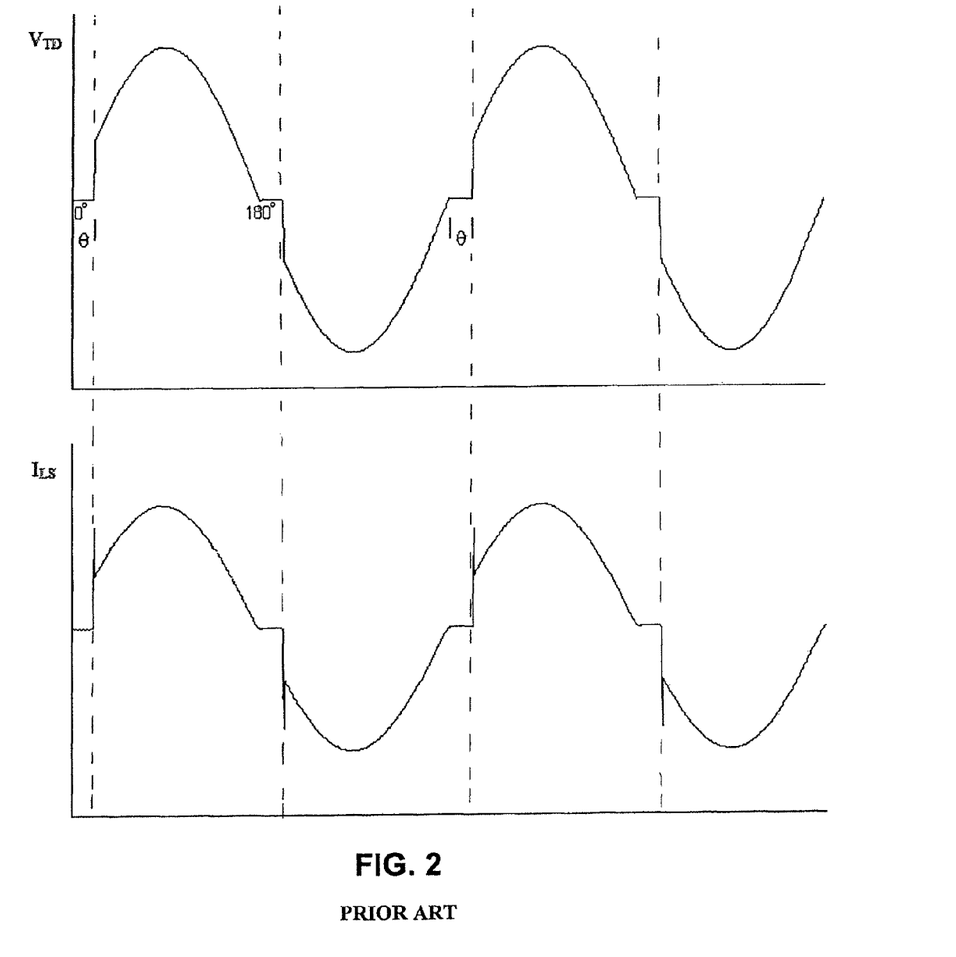
FIG. 2 is a diagram showing waveforms at the minimum firing angle of the dimmer output voltage and the LED light source input current for the conventional circuit of FIG. 1.

The upper waveform of FIG. 2 shows the output voltage $V_{TD}$ waveform of a leading edge type triac dimmer 14 at a maximum brightness setting. The firing angle, which is the phase angle of the voltage at which the triac dimmer conducts, is at its minimum. The lower waveform of FIG. 2 shows the input current waveform $I_{LS}$ of the LED light source 10 when the triac dimmer 14 is at a maximum.

Figure 3:
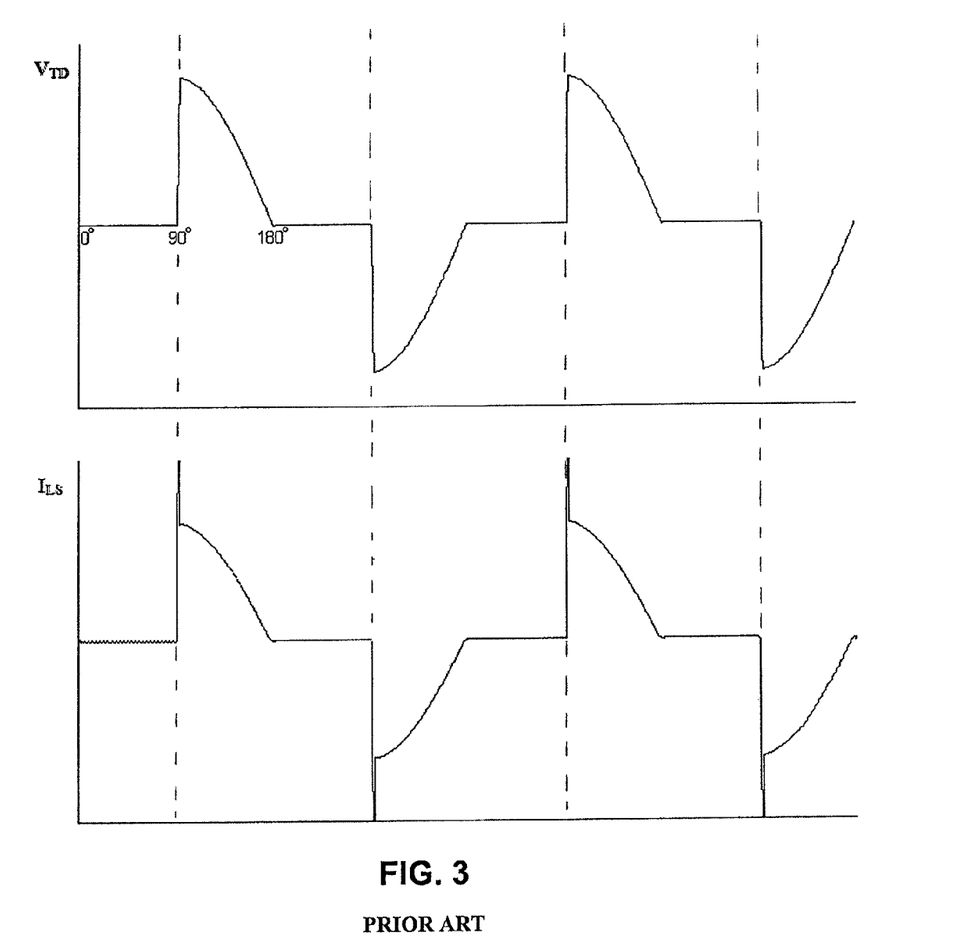
FIG. 3 is a diagram showing waveforms at a 90 degree firing angle of the dimmer output voltage and the LED light source input current for the conventional circuit of FIG. 1.
Figure 4:
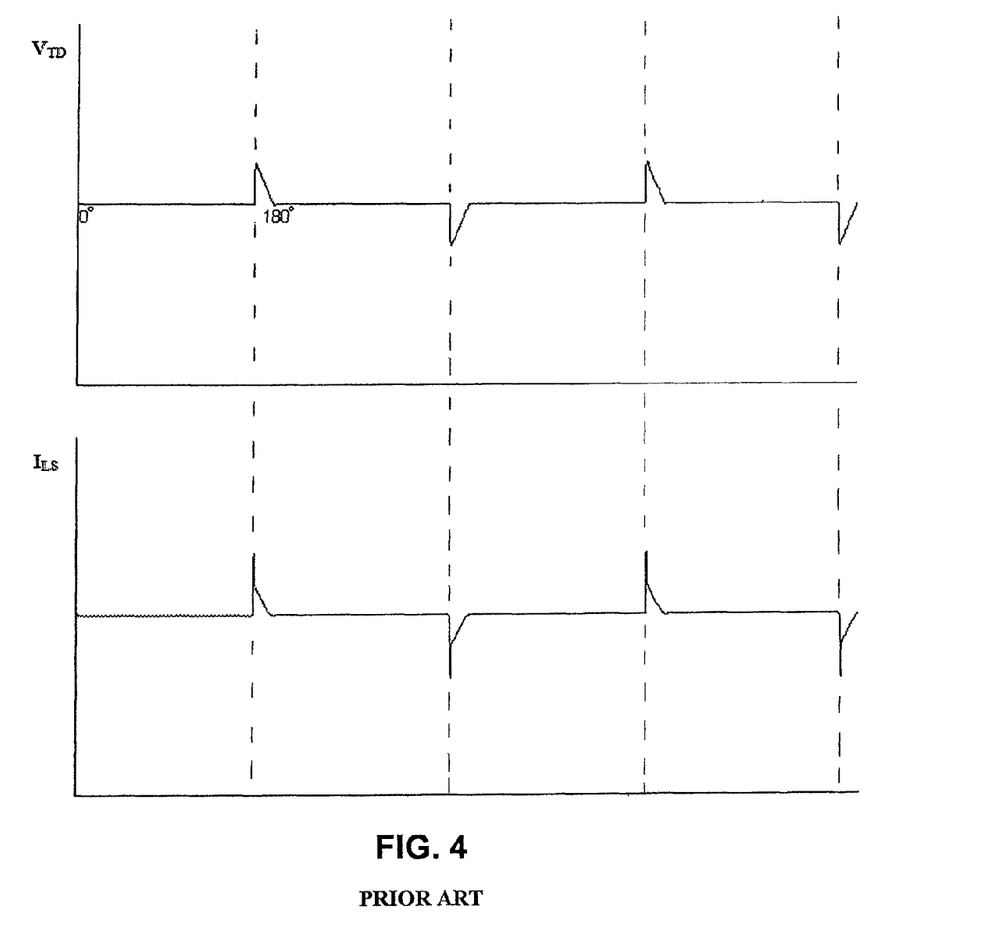
FIG. 4 is a diagram showing waveforms at the maximum firing angle of the dimmer output voltage and the LED light source input current for the conventional circuit of FIG. 1.

As the dimmer adjusts, the firing angle is changed. FIG. 3 shows the voltage $V_{TD}$ and current $I_{LS}$ waveforms when the firing angle is set to 90 degrees (about half brightness) and FIG. 4 shows the voltage $V_{TD}$ and current $I_{LS}$ waveforms when the firing angle is set to maximum firing angles (minimum brightness).

However, most dimmers are not able to power on if they are preset to maximum firing angle. The user has to turn the dimmer up for proper power on and then dim down to the desired brightness. Moreover at maximum firing angle, even if the dimmer is able to turn itself on, the dimmer output voltage would be too low to kick-start the LED light source circuitry.

There is a need for a power supply method and apparatus that does not suffer from these deficiencies.

BRIEF SUMMARY OF THE INVENTION

In consideration of the above, in accordance with a first aspect of the present invention, a method of driving a light emitting diode (LED) light source comprises: providing an alternating voltage power supply having positive and negative half cycles; adjusting a dimmer having a firing angle to provide current to the LED when the firing angle, after a beginning of the positive or negative half cycle, has been reached; waiting a time period after the beginning of the positive or negative half cycle; and reducing current to the LED at the end of the time period, wherein the time period does not exceed an end of the positive or negative half cycle.

In another aspect, a period of reduced current to the LED is a fixed time period.

In another aspect, a period of reduced current to the LED is a variable time period.

In another aspect, the period of reduced current to the LED is set to be proportional to the firing angle of the dimmer.

In accordance with another aspect of the present invention, a circuit for driving a light emitting diode (LED) comprises: an alternating voltage power supply, comprising a triac dimmer having a firing angle and output terminals that provide power to the LED; a zero crossing detector that detects a polarity change of the alternating voltage provided by the alternating voltage power supply and provides a zero crossing output signal indicative of the zero crossing; a timer triggered by the zero crossing output signal that generates a timer output signal during a time period of the timer; and LED power circuitry that reduces current to the light emitting diode based upon timing characteristics of the timer output signal.

In another aspect, the circuit further comprises: a second voltage detector that detects a dimmer voltage and outputs a voltage detector output; and logic circuitry configured to logically combine the voltage detector output and the timer output signal and produce a charging signal to charge and discharge a timing capacitor coupled to the LED power circuitry for switching between normal and reduced current to the LED.

In another aspect, the logic circuitry comprises: a logic gate that receives and logically combines the voltage detector output and the timer output signal; one or more resistors that control the charging and discharging current to the timing capacitor; and one or more diodes that separate a charging and discharging path.

In another aspect, the circuit further comprises a pulse shaping amplifier that converts the timing capacitor voltage into a digital signal that is output to the LED power circuitry.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which.

DETAILED DESCRIPTION OF THE INVENTION

In accordance with aspects of the present invention, apparatus and methods of driving an LED light source are proposed such that the driven LED light source draws a reduced current from the dimmer when the phase angle of the half-cycle voltage exceeds certain pre-defined value. A fixed period of reduced current is inserted in the trailing part of the half cycle. Instead of adjusting the dimmer all the way down to maximum firing angle, in accordance with driving according to aspects of the present invention, the user only turns the dimmer to the pre-defined angle for minimum brightness. At the pre-defined angle, the dimmer should be able to power on and the dimmer output voltage should be high enough to start the LED light source circuitry.

Figure 5:
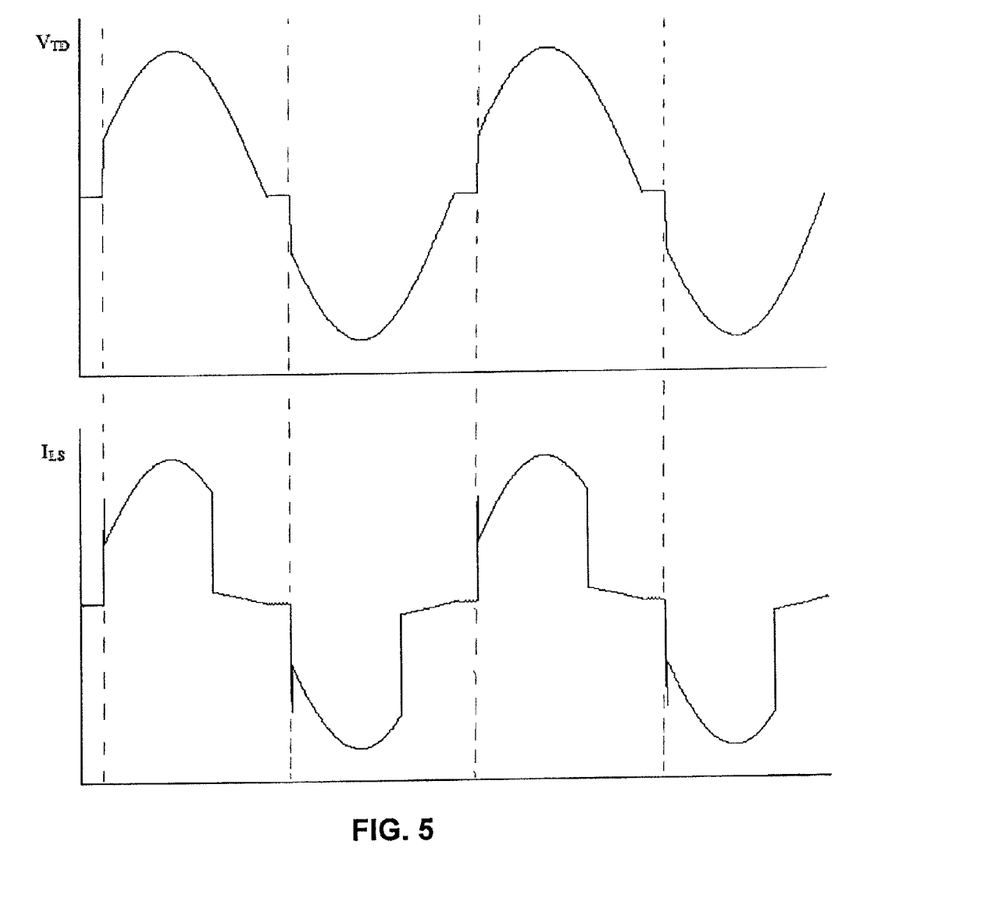
FIG. 5 is a diagram showing waveforms at the maximum brightness of the dimmer output voltage and the LED light source input current in accordance with an aspect of the present invention.
Figure 6:
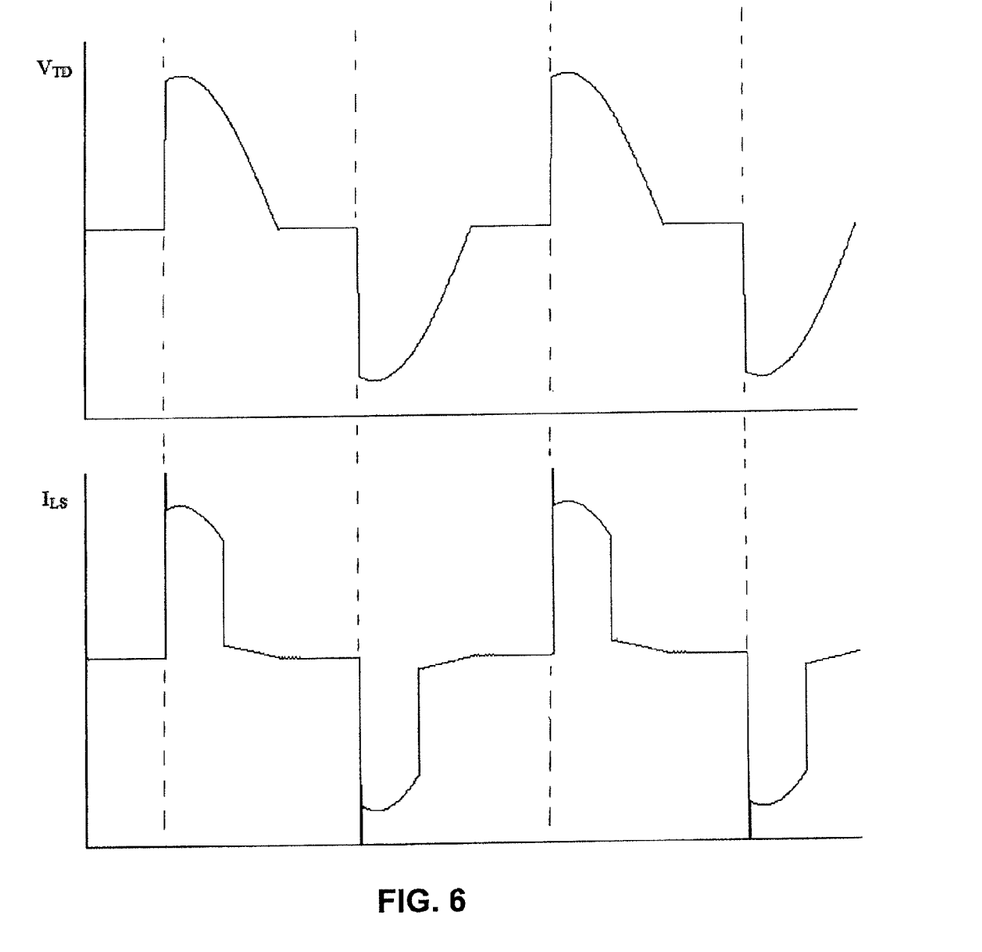
FIG. 6 is a diagram showing waveforms at half brightness of the dimmer output voltage and the LED light source input current in accordance with an aspect of the present invention.
Figure 7:
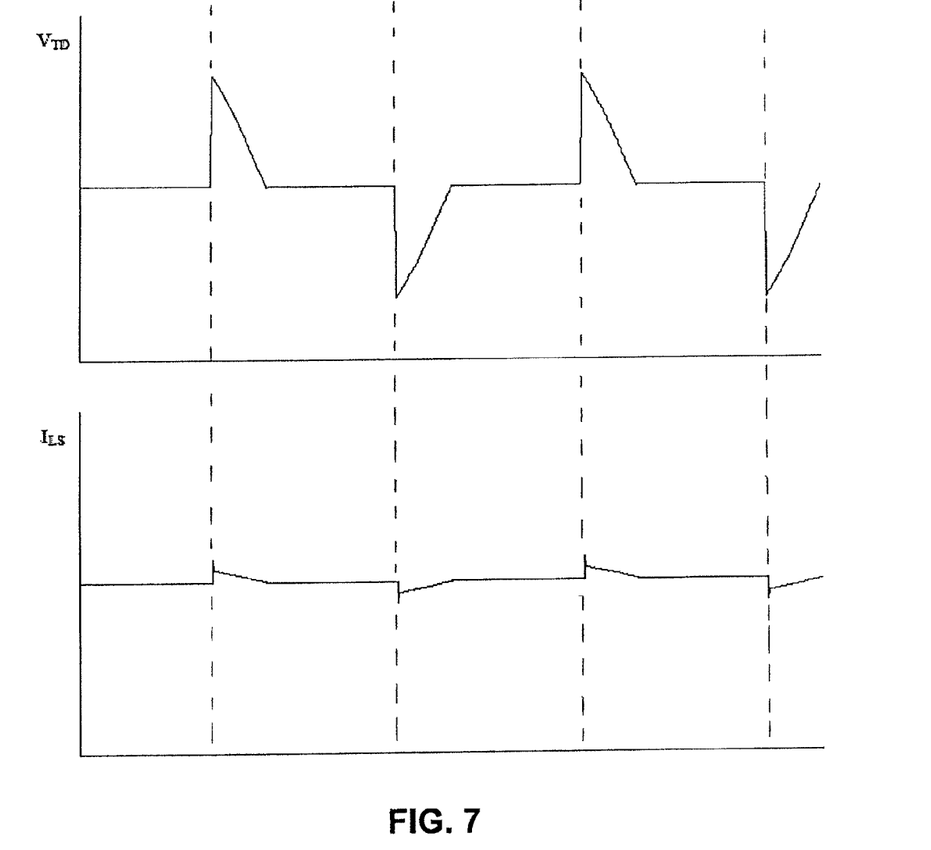
FIG. 7 is a diagram showing waveforms at the minimum brightness of the dimmer output voltage and the LED light source input current in accordance with an aspect of the present invention.

FIG. 5 illustrates dimmer voltage $V_{TD}$ and current waveform $I_{LS}$ when the brightness is set to maximum brightness, in accordance with the driving method of one aspect of the present invention. As can be seen from the figure, the dimmer output voltage $V_{TD}$ waveform is same as the one from FIG. 2. However, the current waveform $I_{LS}$ is different. The trailing part of the current $I_{Ls}$ is significantly reduced at each half-cycle. FIG. 6 shows the dimmer voltage $V_{TD}$ and current waveform $I_{LS}$ when the brightness is set to half brightness, in accordance with the driving method of one aspect of the present invention. FIG. 7 shows the dimmer voltage $V_{TD}$ and current waveform $I_{LS}$ when the brightness is set to minimum brightness, in accordance with the driving method of one aspect of the present invention. Because of the reduced current, the minimum brightness firing angle is smaller as compared with the one from FIG. 4. The dimmer output voltage $V_{TD}$ is also higher than the one from FIG. 4. At such minimum brightness firing angle, the dimmer should be able to power on and the dimmer output voltage should be high enough to start the LED light source circuitry.

Figure 8:
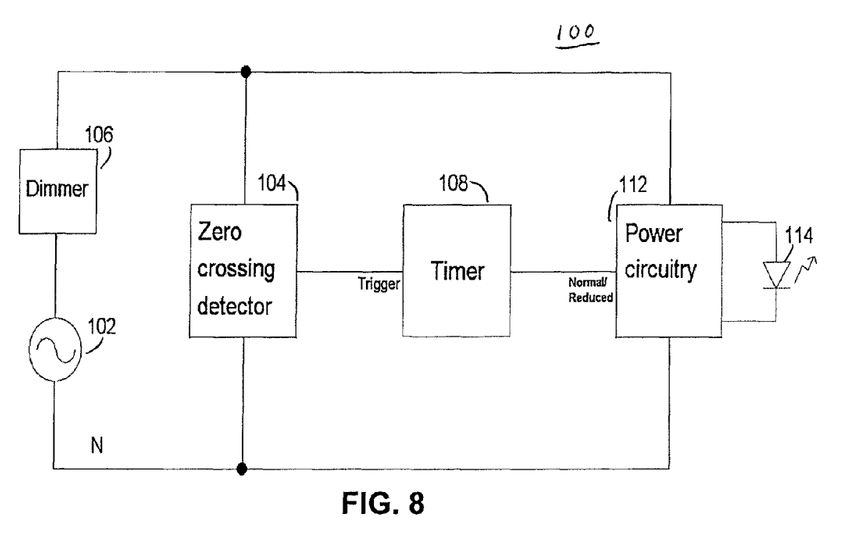
FIG. 8 is a schematic diagram of a dimmable LED power supply in accordance with an aspect of the present invention.

FIG. 8 shows a dimmable LED power supply circuit 100 that provides a way of implementing this dimming method, in which a zero crossing detector is used to detect the polarity change of the AC input voltage. The power supply circuit 100 in accordance with this embodiment of the present invention includes an AC input voltage source 102, a triac dimmer 106, a zero crossing detector 104, a timer 108, power circuitry 112, and an LED 114. The polarity change detected by the zero crossing detector 104 triggers the timer 108, which generates a signal to switch the power circuitry 112 from normal current mode to reduced current mode.

Figure 9:
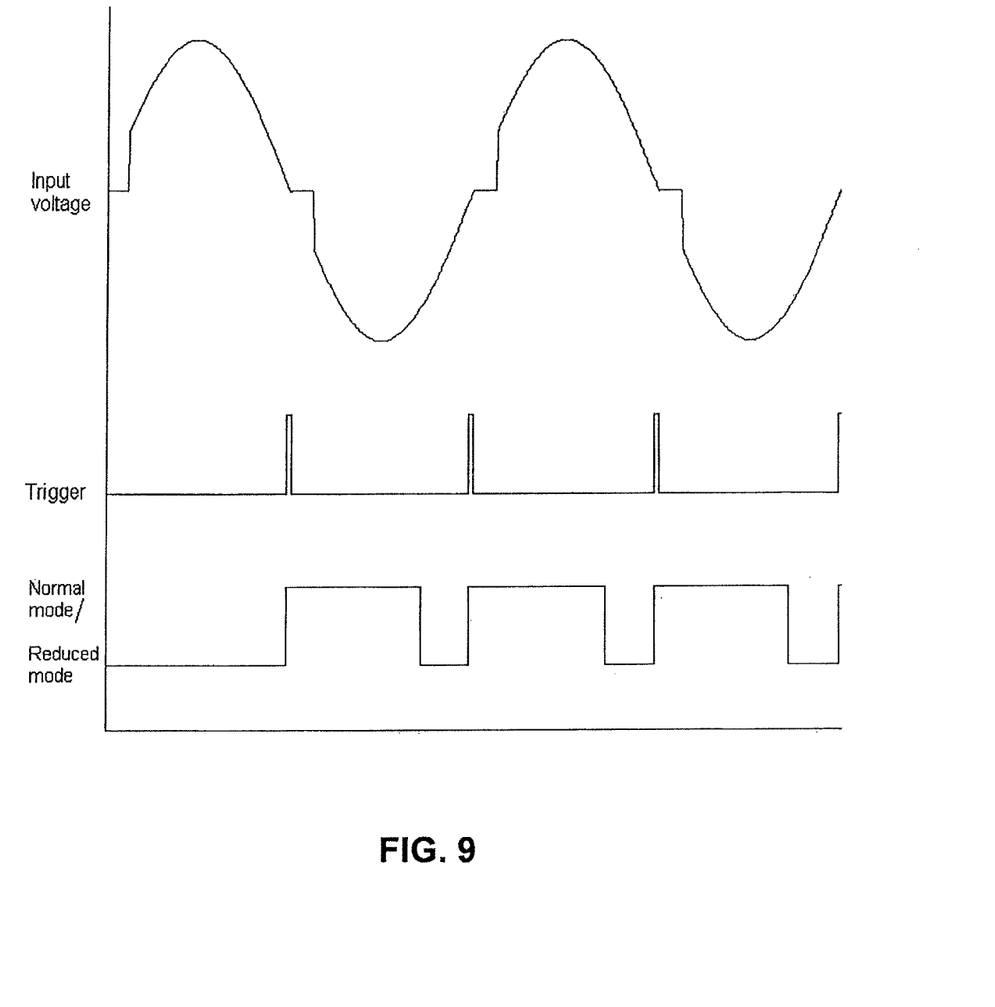
FIG. 9 shows waveforms for the input voltage, the trigger voltage and the mode voltage in the power supply shown in FIG. 8.

FIG. 9 shows the signal waveforms for each functional block of the circuit of FIG. 8. The use of the power supply circuit 100 in accordance results in the reduced current as shown in the waveforms of FIGS. 5-7.

A variation of the proposed method in accordance with another embodiment of the present invention uses a variable off period instead of fixed off period in the trailing part of the half cycle. In accordance with this aspect of the present invention, the off period is chosen to be proportional with the firing angle of the triac dimmer. If the firing angle of the triac dimmer is θ, the angular displacement during the off period will be kθ, where k is a constant.

Figure 10:
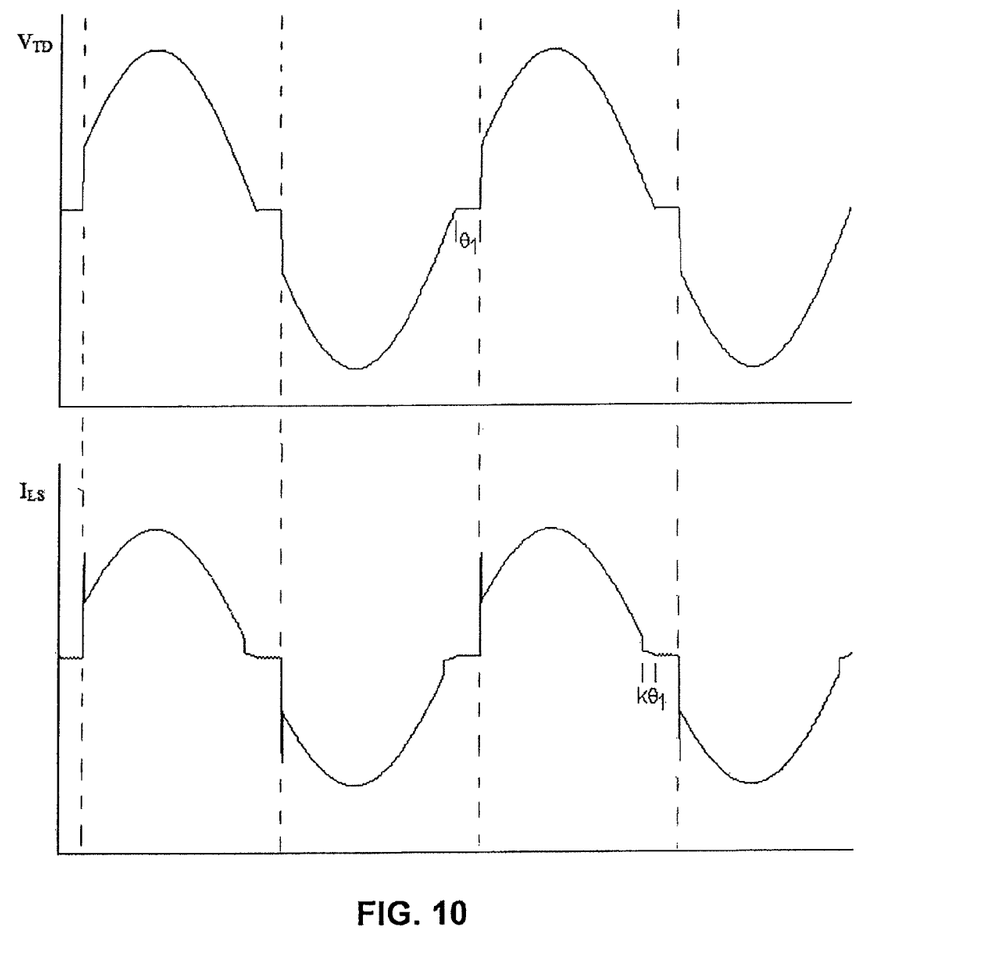
FIG. 10 is a diagram showing waveforms at the maximum brightness of the dimmer output voltage and the LED light source input current in accordance with an aspect of the present invention with a variable off-time.
Figure 11:
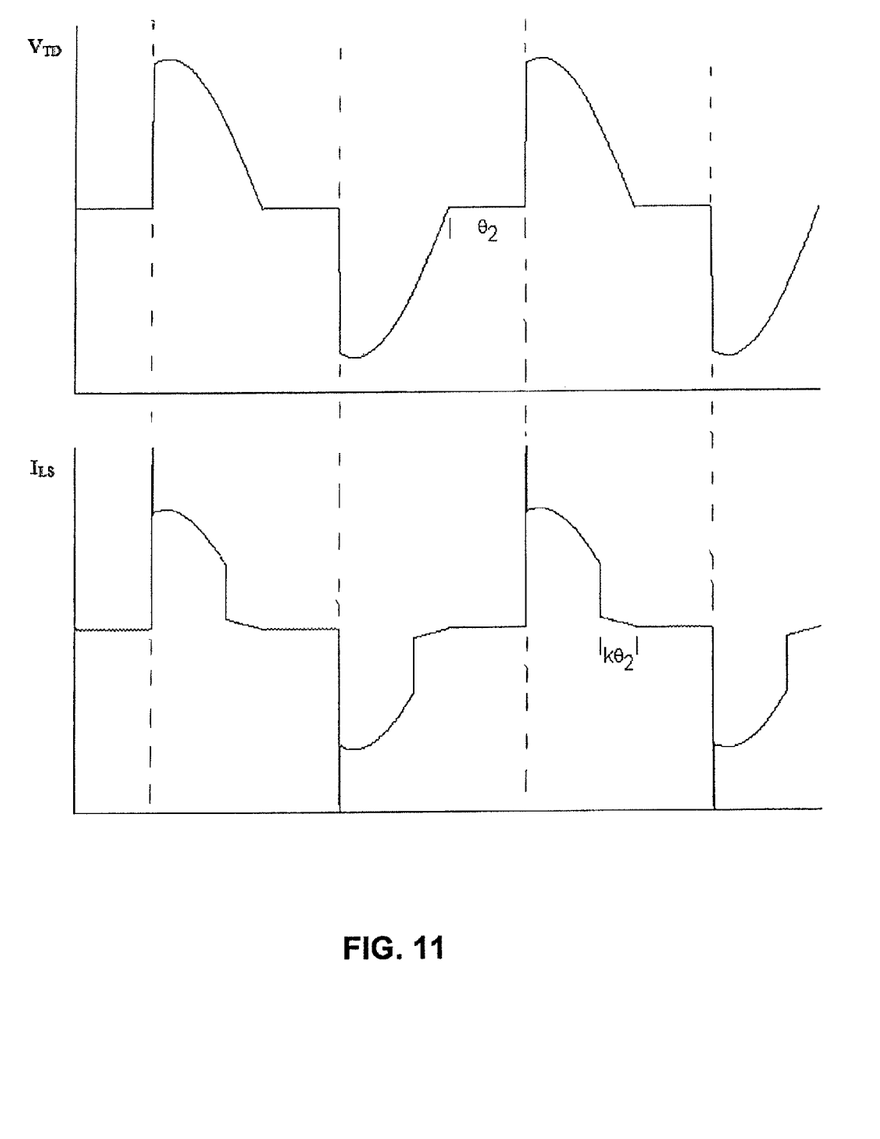
FIG. 11 is a diagram showing waveforms at half brightness of the dimmer output voltage and the LED light source input current in accordance with an aspect of the present invention with a variable off-time.
Figure 12:
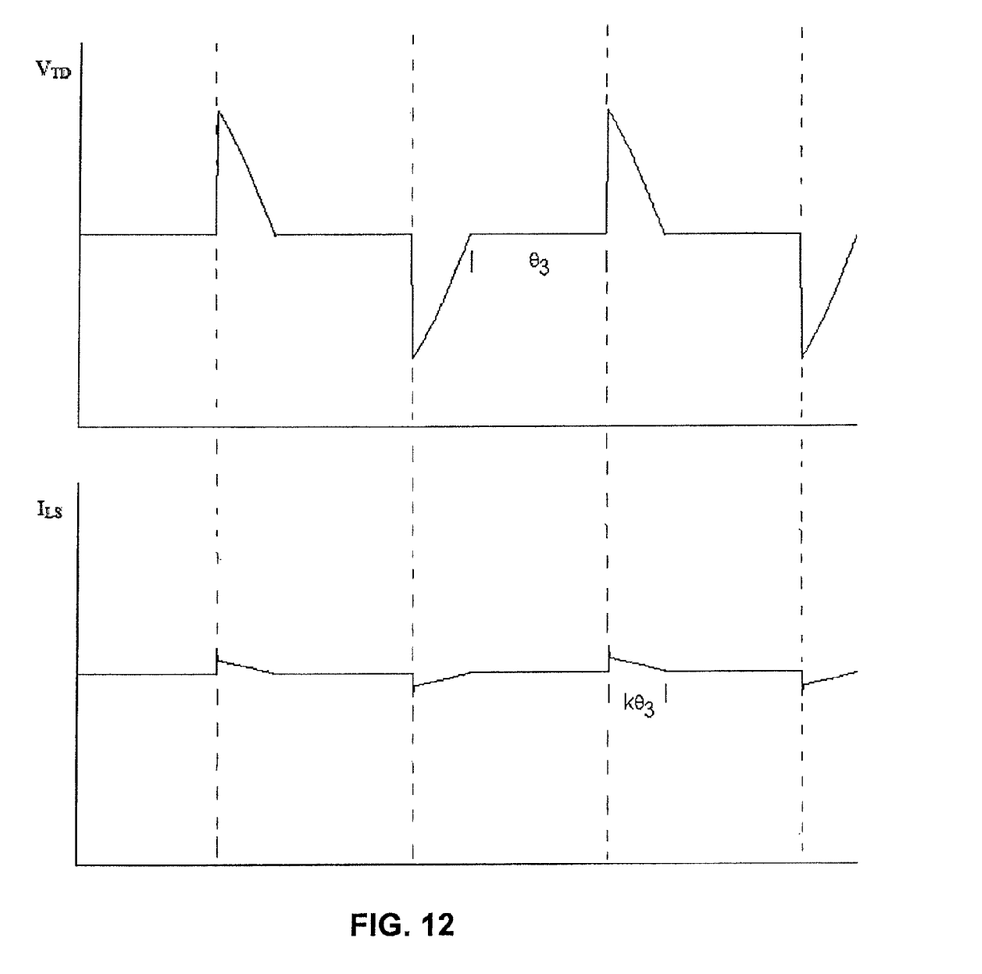
FIG. 12 is a diagram showing waveforms at the minimum brightness of the dimmer output voltage and the LED light source input current in accordance with an aspect of the present invention with a variable off-time.

FIGS. 10-12 show the voltage $V_{TD}$ and current waveforms $I_{LS}$ for the variable off period embodiment of the present invention, when the brightness is set to maximum, half, and minimum, respectively.

It can be noted that with the variable off-time scheme of this aspect of the present invention, the firing angle of the dimmer at minimum brightness can also be shifted to a smaller value. In addition, the power factor at full brightness will be better than for the fixed off-time scheme discussed above.

Figure 13:
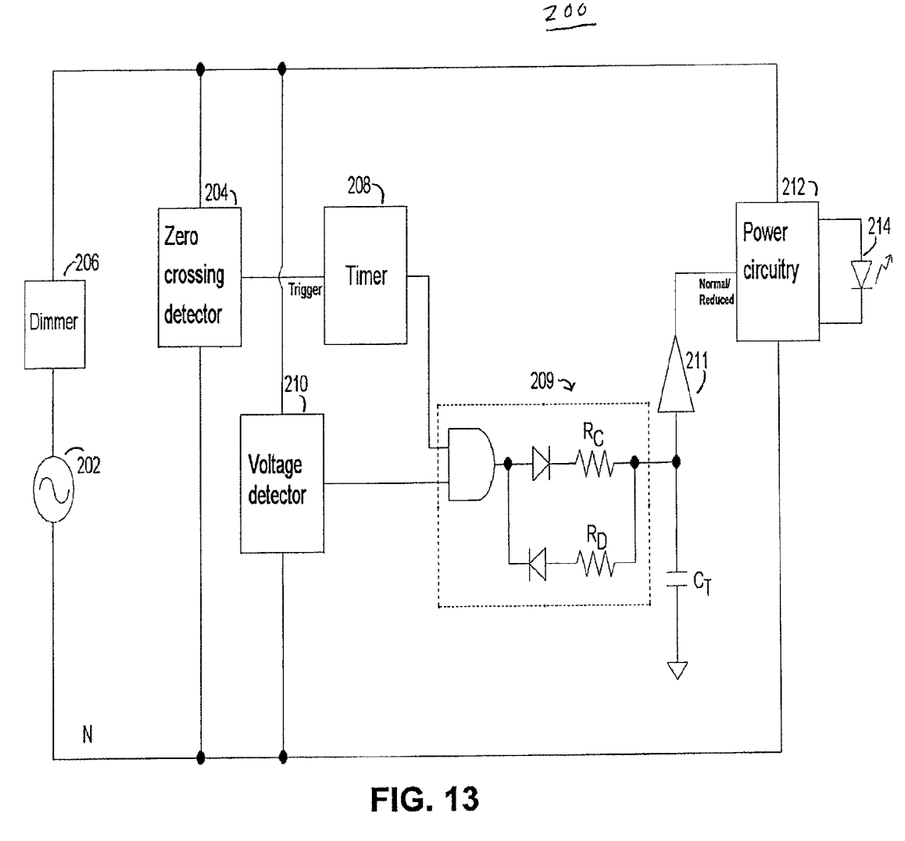
FIG. 13 is a diagram of a dimmable LED power supply in accordance with another aspect of the present invention with a variable period function.

FIG. 13 shows a dimmable LED power supply circuit 200 that provides a way of implementing the variable off period scheme in accordance with this aspect of the present invention. In the circuit 200, zero crossing voltage detector 204 is used to detect the polarity change of the AC input voltage provided by AC voltage source 202. The polarity change triggers a timer 208. A second voltage detector 210 is used to detect the voltage from the dimmer 206. The output of the voltage detector 210 is logically combined with the output of the timer 208 using logic circuitry 209. In this circuitry the diodes are used to separate the charging and discharging path, while the resistors $R_C$ and $R_D$ are used to control the charging and discharging current. The resultant signal is used to charge and discharge a timing capacitor $C_T$. $R_C$ controls the charging current while $R_D$ controls the discharging current. Different charging and discharging current can be selected with different values of $R_C$ and $R_D$. The capacitor voltage is then converted to a digital signal, by pulse shaping, by the pulse shaping amplifier 211. This signal is then fed to the power circuitry 212 for switching between a normal and a reduced current mode.

Figure 14:
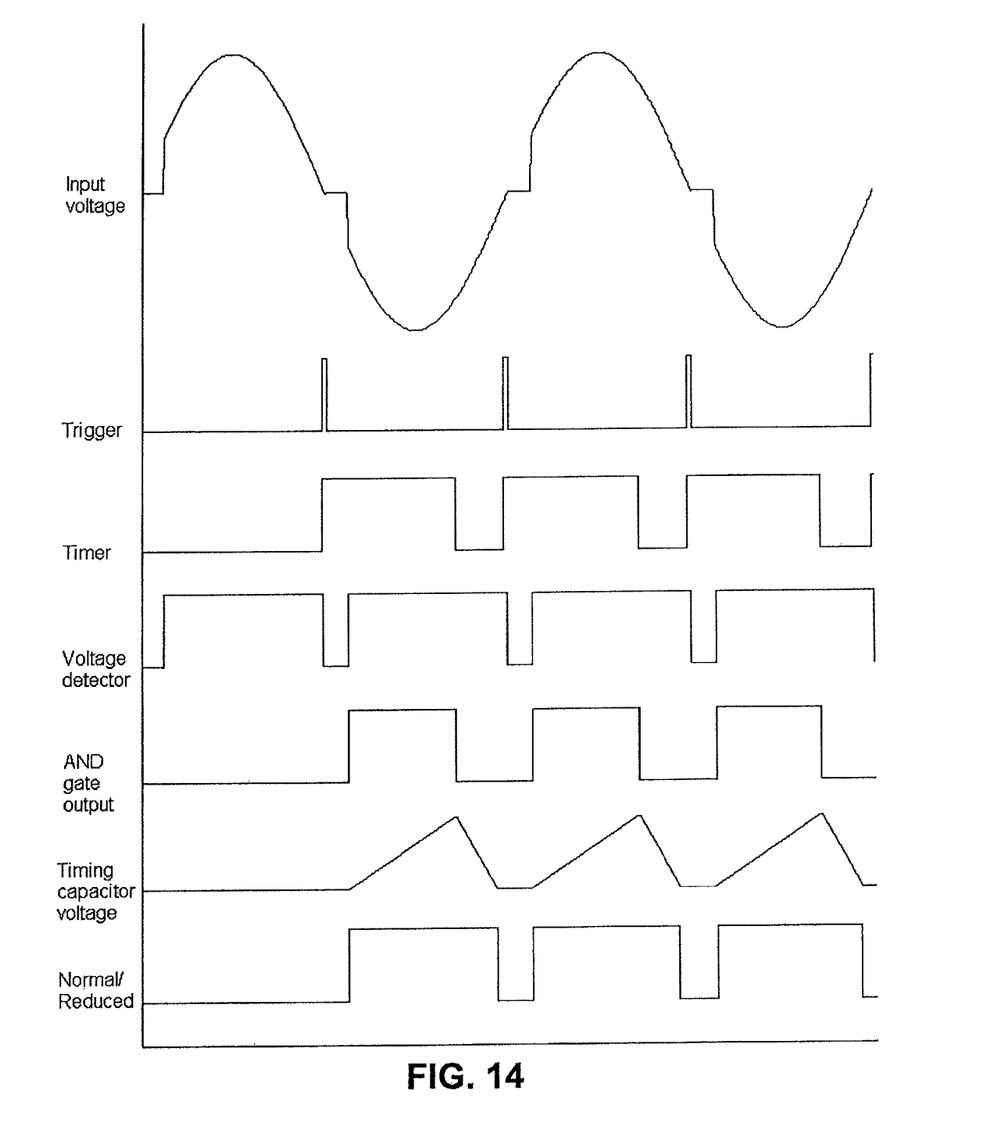
FIG. 14 is a diagram showing signal waveforms of functional blocks of the power supply in accordance with an aspect of the present invention shown in FIG. 13.

FIG. 14 illustrates the signal waveforms of each functional block of the circuit shown in FIG. 13. The use of the circuit 200 results in the variable off period current waveforms of FIGS. 10-12.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A circuit for driving a light emitting diode (LED), the circuit comprising: an alternating voltage power supply, comprising a triac dimmer having a filing angle and output terminals that provide power to the LED;

a zero crossing detector that detects a polarity change of the alternating voltage provided ate alternating voltage power supply and provides a zero crossing output signal indicative of the zero crossing;

a timer triggered by the zero crossing output signal that generates a timer output signal during a time period of the timer;

LED power circuitry that reduces current to the light emitting diode based upon timing characteristics of the timer output signal;

a voltage detector that detects a dimmer voltage and outputs a voltage detector output;

logic circuitry to logically combine the voltage detector output and the timer output signal and produce a charging signal to charge and discharge a timing capacitor coupled to the LED power circuitry for switching between normal and reduced current to the LED, wherein the logic circuitry comprises:

a logic gate that receives and logically combines the voltage detector output and the timer output signal;

one or more resistors that control the charging and discharging current to the timing capacitor; and one or more diodes that separate a charging and discharging path.

2. A circuit for driving a light emitting diode (LED), the circuit comprising;

an alternating voltage power supply, comprising a triac dimmer having a firing angle and output terminals that provide power to the LED;

a zero crossing detector that detects a polarity change of the alternating voltage provided by the alternating voltage power supply and provides a zero crossing output signal indicative of the zero crossing;

a timer triggered by the zero crossing output signal that generates a timer output signal during a time period of the timer;

LED power circuitry that reduces current to the light emitting diode based upon timing characteristics of the timer output signal;

a voltage detector that detects a dimmer voltage and outputs a voltage detector output;

logic circuitry configured to logically combine the voltage detector output and the timer output signal and produce a charging signal to charge and discharge a timing capacitor coupled to the LED power circuitry for switching between normal and reduced current to the LED; and a pulse shaping amplifier that converts the timing capacitor voltage into a digital signal that is output to the LED power circuitry.

* * * * *